June 3, 1952 H. JENSEN 2,598,698
METHOD AND APPARATUS FOR MAGNETIC EXPLORATIONS
Filed July 2, 1946 3 Sheets-Sheet 2
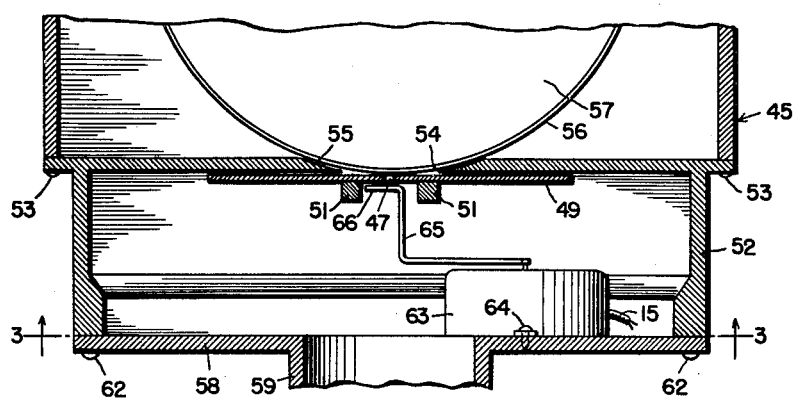
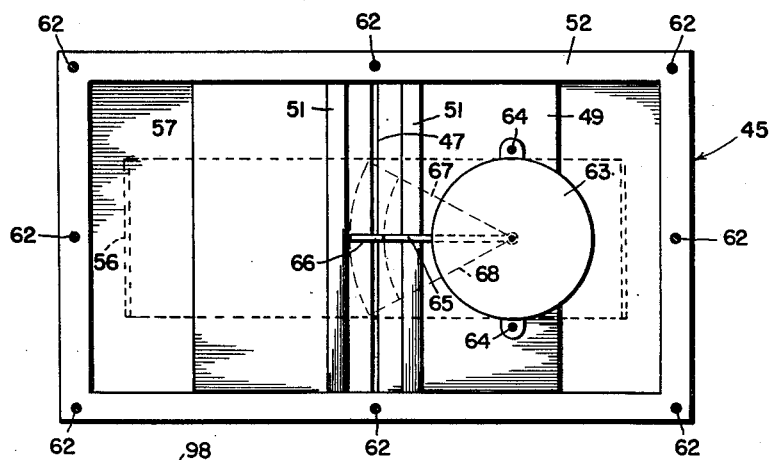
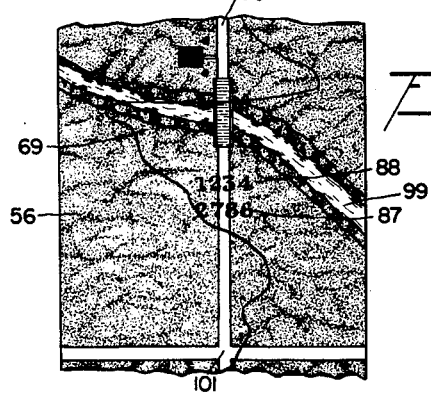
Inventor
HOMER JENSEN June 3, 1952     H. JENSEN     2,598,698
METHOD AND APPARATUS FOR MAGNETIC EXPLORATIONS
Filed July 2, 1946     3 Sheets-Sheet 3
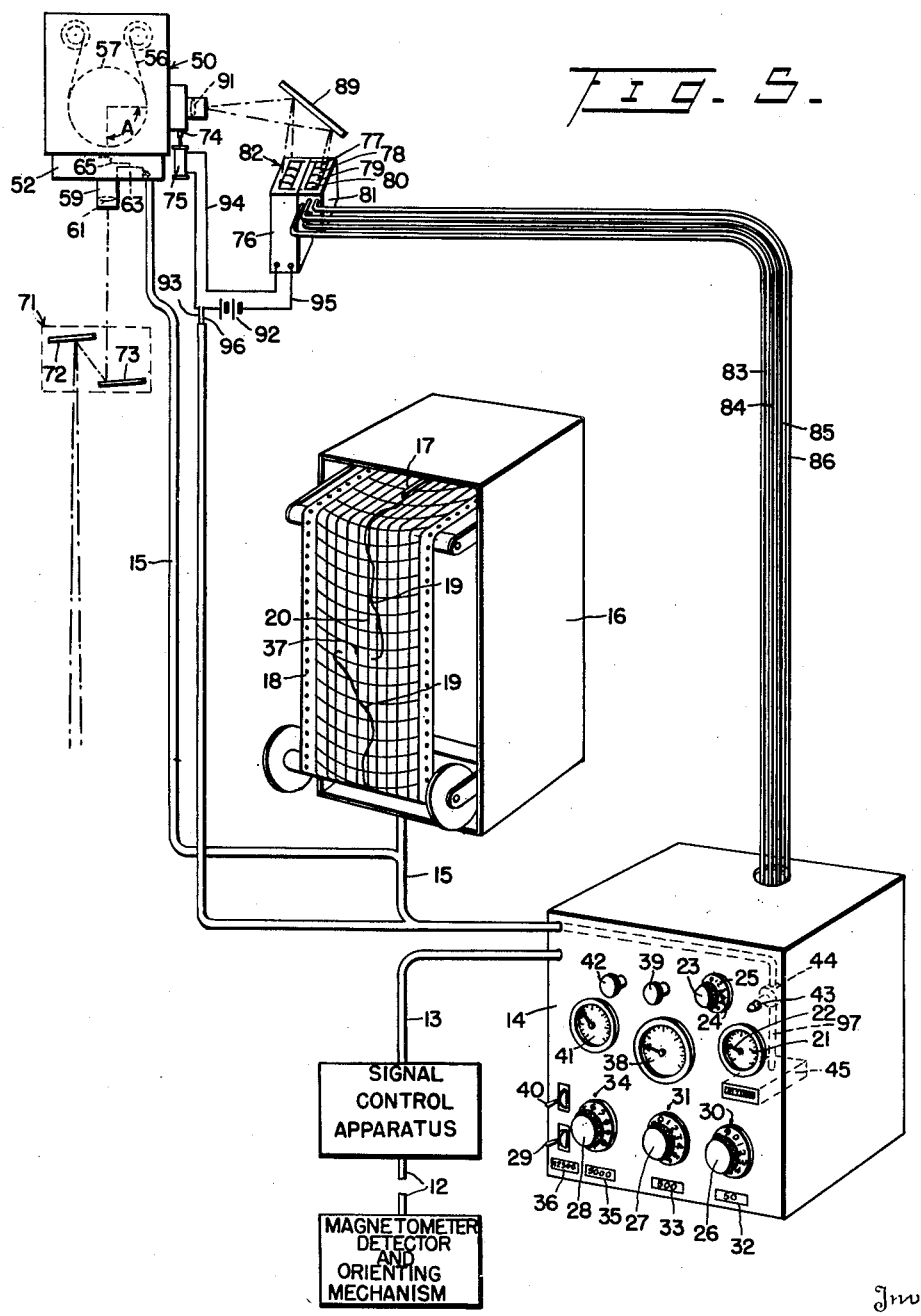
Inventor
HOMER JENSEN Patented June 3, 1952

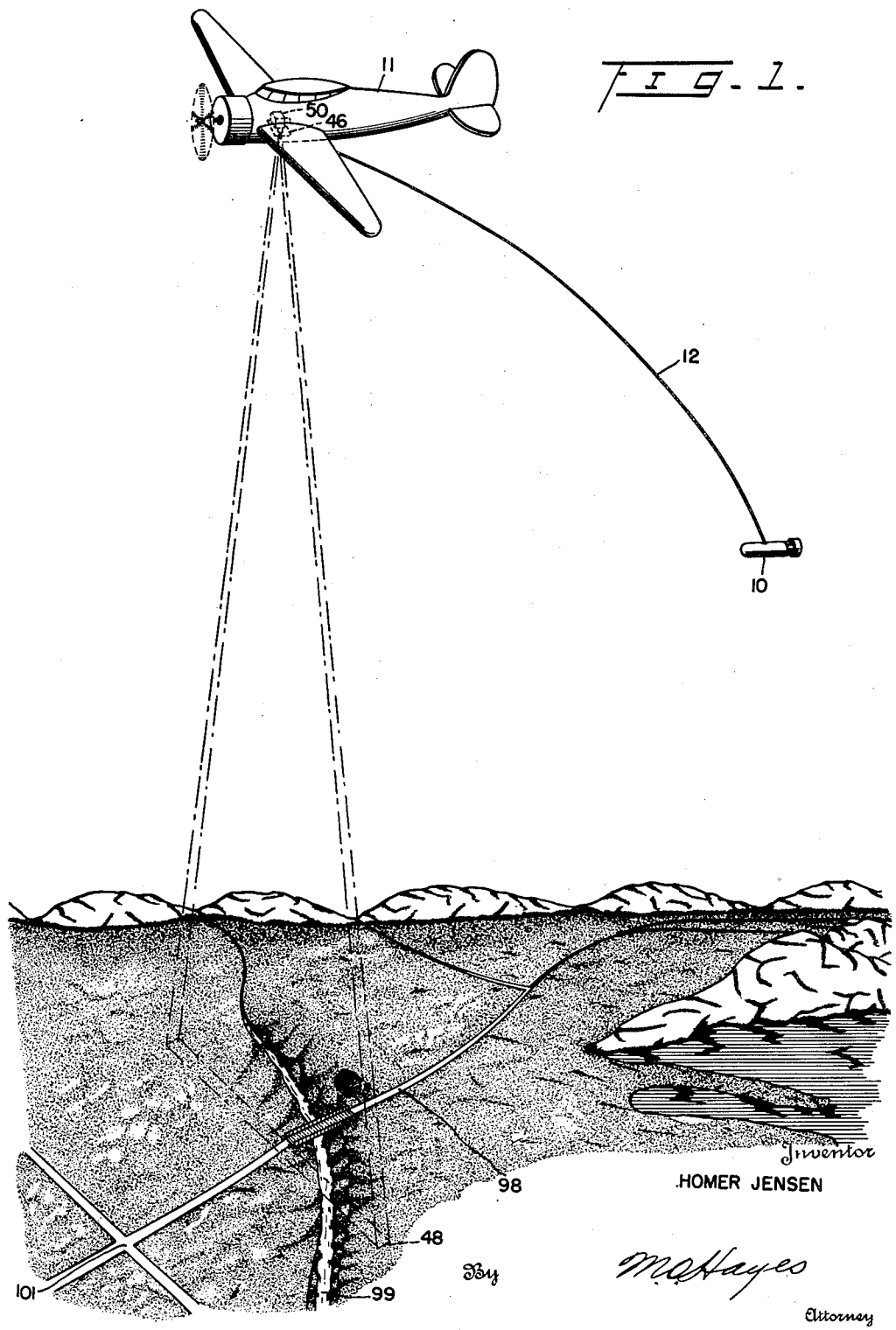

2,598,698

UNITED STATES PATENT OFFICE 2,598,698

METHOD AND APPARATUS FOR MAGNETIC EXPLORATIONS

Homer Jensen, Philadelphia, Pa.

Application July 2, 1946, Serial No. 680,908

7 Claims. (Cl. 175—182)

(Granted under the act of March 3, 1883, as amended April 30, 1928; 370 O. G. 757)

This invention relates generally to methods and apparatus for conducting magnetic explorations from an aircraft in flight and more particularly to improvements in the method and apparatus of my copending application for Method and Apparatus for Magnetic Exploration, Serial No. 680,906, filed July 2, 1946.

In the aforesaid application, a standard Navy magnetic airborne detector, identified as

AN/ASQ-3A and referred to hereinafter as MAD, is adapted to provide a continuous record trace corresponding to space changes in the total value of the earth's magnetic field as the aircraft support therefor moves along a predetermined traverse.

Photographic apparatus including a continuous-strip type camera is employed therewith for producing a continuous photographic record of the terrain disposed along the traverse simultaneously with the record trace, and apparatus operable at will is employed to cause an identifying serial number to appear on the film, and simultaneously therewith, to produce an edge-mark on the record tape or chart upon which the record trace appears, thereby to provide data from which a continuous correlation between the trace and the ground positions corresponding thereto may be produced.

Printing apparatus also is operatively associated with the recorder providing the record trace and is adapted to cause identifying numbers corresponding to those appearing on the record film and data relating to the sensitivity of the MAD and the magnetic value of the base line of the record tape to be printed thereon at will, this being done particularly after base and/or sensitivity changes have been made at the control box of the MAD, the dials of which are operatively connected to certain of the printing wheels comprising the printing apparatus.

In the use of this apparatus in conducting geophysical surveys, continuous records of space changes in the absolute or static value of the earth's magnetic field and of the terrain are produced simultaneously as the aircraft moves along predetermined traverses at each of several altitudes, and at selected intervals therealong the record chart is edge-marked, and simultaneously therewith, a serial number corresponding thereto is superimposed on the photographic record of the terrain. At other intervals along the traverse, the printing apparatus is actuated to print on the recording chart a serial number corresponding to that appearing on the photographic record and data relating to the sensitivity of the MAD and the magnetic value of the base line of the recording chart.

Thereafter, in plotting charts providing the true relation between the variations in the magnetic field and the ground positions corresponding thereto, it is necessary first to determine the true distances between the edge-marks on the record chart by determining the corresponding distances between the corresponding serial numbers on the photographic record in terms of known distances appearing thereon, and thereafter to convert the curvilinear coordinates to rectangular coordinates and correct for distance variations and discontinuities in the record trace, the discontinuities therein being due to changes in the settings of the control box dials.

From the charts, thus prepared, it is possible to draw isomagnetic contours from which logical inferences and accurate quantitative deductions as to the nature of the substrata can be established.

According to the arrangement of the present invention, the aforedescribed step in printing the data relating to the control box settings on the record tape or chart is obviated by causing this data to be photographed by the continuous-strip camera and by causing the shadow of a galvanometer needle to so move in relation to the slit in the continuous-strip camera as to produce on the photographic record a trace which is the equivalent of that otherwise produced by the aforesaid recorder, the signals from the MAD, corresponding to the space changes in the field detected thereby, being caused to drive the galvanometer.

These signals are also caused to drive a recorder, as in the copending application, since it usually is desirable to provide a visual indication of variations in the field.

In the use of the apparatus of the present invention in conducting geophysical surveys, therefore, it merely becomes necessary to convert the curvilinear coordinates of the record shadow trace to rectangular coordinates and correct for distance variations and discontinuities in the trace, all of the necessary data being provided entirely on the photographic record.

The apparatus of the present invention is also well adapted for use in providing precise correlation between time rate of change variations in the ambient field of the MAD detector and magnetic objects such, as camouflaged ordnance materiel, which produce the changes in the field, the MAD being set for time rate of change response for purposes of such detection in the manner more fully set forth in the copending application of Lynn H. Rumbaugh et al. for Magnetic Exploration Method and Apparatus, Serial No. 676,050, filed June 11, 1946.

It is an object of the present invention, therefore, to provide a new and improved method and apparatus for conducting geophysical surveys from an aircraft in flight.

Another object is to provide a method of geophysical surveying from an aircraft in flight wherein all of the necessary data is provided on a single photographic record of the terrain disposed along the traverse of the aircraft.

Another object is to produce a record trace corresponding to variations in the ambient magnetic field of an airborne detector.

Another object is to provide a method and apparatus for producing on a continuous photographic record of the terrain disposed along the traverse of an airborne magnetometer detector, a continuous record trace corresponding to variations in the ambient magnetic field detected by the magnetometer.

Still other objects, features and advantages of the present invention are those implied from or inherent in the novel combination and arrangement of parts wherein the aforedescribed method of the invention is practiced, the foregoing being accomplished by the specific apparatus and in the specific manner hereinafter more fully to appear, reference being had to the accompanying drawings wherein:

Fig 1 is a diagrammatic view of an aircraft and an aerodynamic body towed thereby and suitable for use with the apparatus of the present invention for conducting magnetic surveys according to the method thereof;

Fig. 2 is a sectional view of the continuous-strip camera illustrating the manner of mounting of the recording galvanometer associated therewith;

Fig. 3 is a sectional view taken along the line 3—3 of Fig. 2;

Fig. 4 is a plan view of a portion of the photographic record obtained in the use of the apparatus of the present invention; and Fig. 5 is a diagrammatic view of the complete apparatus according to the preferred embodiment of the invention, this apparatus being supported in part in the aircraft and in part in the aerodynamic body of Fig. 1.

Referring now to the drawings for a more complete understanding of the invention, the MAD equipment shown diagrammatically in Fig. 5 comprises a magnetometer detector and an orienting mechanism therefor, which components are contained within the aerodynamic body 10, Fig. 1. The body or bird 10 is of non-magnetic construction and is towed from the aircraft 11 at a distance therefrom by a cable 12 so as to avoid the effects of the magnetic field of the aircraft. The aircraft 11, accordingly, may be of any suitable type providing the desired speed and capacity regardless of the amount of steel which it may contain, the installation of the MAD and the photographic apparatus employed therewith being largely a matter of establishing connections between the components of the apparatus and adapting and mounting the same within the aircraft. The bird, however, must be connected so as to be aerodynamically stable in flight, a suitable bird, for example, being similar to that disclosed and claimed in the copending application of Gerhard O. Haglund for Aerodynamic Body, Serial No. 671,341, filed May 21, 1946, now Patent No. 2,551,596.

Towing cable 12 is a strain-cored multi-conductor cable and serves to electrically interconnect the magnetometer detector and orienting mechanism with the signal control apparatus therefor carried within the aircraft 11, whereby a detecting element in the bird is adapted to be maintained in alignment with the direction of the earth's magnetic field under control of the signal control apparatus.

The signal control apparatus also operates to produce electrical signals which correspond to space changes in the total value of the earth's magnetic field sensed by the aforesaid detector element, and these signals are applied by way of a cable conductor 13, control box 14, and cable conductor 15 to a recording milliammeter 16 to drive the pen 17 thereof with respect to its coacting chart 18 whereby a record trace 19 is produced on the chart. Recorder 16 preferably is of the E-A type of spring-drive recorder well known in the art.

The electrical signals produced by the signal control apparatus also operate a galvanometer 21 whereby the pointer 22 thereof indicates in relation to the scale associated therewith, the corresponding movements of the recording pen 17.

The control box 14 also includes a sensitivity adjusting dial 23 by means of which the full scale deflection of the recorder pen 17 from edge to edge of the chart may be controlled, the dial being provided, for example, with sensitivities of 50, 100, 200, 500, 1000 and 5000 gammas, and the pointer 24 being movable into positions opposite the numbers 1 to 6 provided on dial plate 25 and corresponding to the aforesaid sensitivities.

The control box further includes a plurality of dials 26, 27 and 28 and a control switch 29 which control means for nulling out predetermined portions of the total field at the detector element and thus determine the magnetic vaule of the center or base line 20 of the recording chart.

Dials 26 and 27 each have nine positions indicated thereon which are adapted to be moved into alignment with the reference lines 30 and 31 respectively, 50 gammas being provided between positions on dial 26, as indicated at 32, and 500 gammas being provided between positions on dial 27, as indicated at 33. Dial 28 has 10 positions indicated thereon which are adapted to be moved into alignment with the reference line 34, 5000 gammas being provided between these positions, as indicated at 35. Control switch 29 is employed to add 2500 gammas, as indicated at 36, to the nulled out portion of the field, this being useful under certain conditions of adjustment of dials 26 and 27.

Thus, in a total field at the detector element of approximately 56,750 gammas, the nulling means may be arranged to null out permanently 30,000 gammas in the field, dial 28 may be set in position 5 thereof to null out 25,000 gammas, dial 27 set in position 3 thereof to null out 1,500 gammas, and dial 26 set in position 5 thereof to null out 250 gammas whereby the recorder pen 17 is caused to assume a position on the base line 20 of chart 18. Thereafter, upon variation in the field at the detection element, the pen is caused to move to the right or to the left according to increases or decreases in the value of the field from said base value of 56,750 gammas. Occasionally it becomes necessary to adjust the control box dials 23 and 26 through 28, and rarely control switch 29, to keep the pen on scale on the chart, and at such times a break indicated at 37 on the chart, Fig. 5, occurs in the trace 19.

A suitable milliammeter 38 is employed to indicate a constant value of direct current supplied for nulling purposes, variable portions of the current being supplied to the pickup coil of the aforesaid detecting element according to the adjustments of dials 26 through 28 and control switch 29. It is essential that the D. C. source of nulling current be maintained at a constant value in order that adjustments of the dials produce field changes corresponding accurately to the gamma increments indicated thereby. For this purpose, knobs 39 and 42 are provided, the knobs controlling means for adjusting the current value.

A voltmeter 41 also is employed to indicate the value of the voltage supplied to the MAD, this voltage being derived from the power source of the aircraft. The switch 40 is employed for controlling certain circuits during the routine test of the apparatus.

A control button 43, adapted to close a switch 44, is employed to actuate a register counter 45 having the numbers thereon arranged flush with the front panel of the control box, and simultaneously therewith to actuate other apparatus employed in the control circuit thereof, as will appear more fully hereinafter.

The aforedescribed MAD equipment and the operation thereof are described in considerable detail in the operating and maintenance instructions therefor furnished to the Navy and identified as AN-08-10-252 and CO-AN-08-20-14 respectively, and reference may be had thereto for further details of construction and operation. These reports are available in photostat or microfilm form at the Office of Technical Services, Department of Commerce, the report numbers designating these reports being PB-27559 and PB-27560 respectively.

A camera generally designated 50 is suitably mounted within the aircraft for vertical photography of the terrain through a suitable port 46. Camera 50 is preferably of the continuous-strip type such, for example, as the Sonne S-7 manufactured by the Chicago Aerial Survey Company, whereby a continuous photographic record of the terrain may be produced thereby, such a camera being characterized by having a very narrow slit or optical opening 47 which may be adjusted for width, thereby resulting in an angle of acceptance which is extremely narrow, as indicated at 48 in Fig. 1.

Slit 47 is formed within a plate 49 which is strengthened structurally by a pair of square bars 51 secured thereto on opposite sides of the slit. Plate 49 is secured to the bottom of a casing 52 which, in turn, is secured to the main body portion of the camera as by screws 53. The bottom of casing 52 is provided with an opening 54 adjacent the slit 47 and formed arcuately as at 55 to receive the film 56 on drum 57 in closely spaced relation to the slit.

A casing cover plate 58 having a housing portion 59 for the main lens 61 of the camera is secured to casing 52 as by a plurality of screws 62. A conventional galvanometer 63 is secured to the inner side of cover plate 58 as by screws 64 and includes an indicating pointer or needle 65 which is formed into a crank-shape to provide a needle portion 66 which lies adjacent slit 47 between brace members 51 whereby a needle portion equal approximately to the width of the slit may be disposed within the path of the light rays passing through the slit over the entire width of the film as the needle moves angularly between the limits indicated at 67—68 in Fig. 3. Thus, the galvanometer needle portion casts a shadow on the film, the shadow taking the form of a continuous trace 69, Fig. 4, as the film moves past the slit and the needle moves angularly in response to variable signals supplied to the galvanometer. These signals are the same as those supplied to recorder 16, and thus, trace 69 is indicative of the variations in the field indicated by trace 19 on the recorder.

The continuous-strip camera is not satisfactory for use at required altitudes unless provision is made for stabilizing the images of the terrain recorded on the film thereof, distortion of the images otherwise resulting from yawing, pitching and rolling of the aircraft in flight. A suitable image stabilizing device is indicated generally at 71 and is disclosed in detail in my copending application for Image Stabilizing Apparatus and Method, Serial No. 662,164, filed April 15, 1946. Suffice it to state herein that the stabilizing device comprises a pair of reflecting elements 72 and 73 which are adapted to be gyroscopically controlled so as to cause various portions of the light path from the terrain to the camera lens 61 to have minimum angles of deviation from each other whereby rotation of the images on the film, and resultant distortion thereof, is reduced to a minimum.

Camera 50 is provided with a shutter 74 which is adapted to be actuated by a solenoid 75 thereby to superimpose on the image of the terrain on the film of the camera, images of a serial number appearing on a conventional register counter 76 and of the numbers appearing on four conventional number wheels 77 through 80 which are supported on a common axis of rotation in a housing 81 and comprise a number indicator generally designated 82 and wheels 77 through 80 are operatively connected, as by flexible cables 83 through 86, to the control dials 23 and 26 through 28 respectively, the operative connections, for example, including gear drives of the same ratios between the cables and the wheels and between the cables and the operating shafts individual to the dials. Thus, numbers corresponding to the positions of the dials are caused to appear on the film, as indicated at 87 in Fig. 4, the numeral 2 indicating the sensitivity setting of dial 23 and numerals 7, 8 and 6 indicating the base settings of dials 26, 27 and 26 of the control box. The serial number appearing on counter 76 appears on the film as at 88 in Fig. 4. The numerals appearing on the photographic record will be spaced thereon at a constant film distance A from the ground positions corresponding thereto.

A reflecting element 89 is employed to bring the register counter 76 and number indicator 82 into the field of view of a lens 91 which is employed to bring the images of the numbers onto the film. The number on the wheels of the register counted 76 and indicator 82 preferably are arranged backwards thereon so as to appear frontwards on the film as indicated in Fig. 4.

Register counters 45 and 76 may be of any suitable type such, for example, as Western Electric register counters, type 12F.

Solenoid 75 and counters 45 and 76 are arranged in a simple series circuit including a battery 92 and the aforementioned switch 44 in the control box whereby these parts are simultaneously energized to actuate shutter 74 and advance the serial numbers upon depression of button 43 on the control box. This circuit may be traced from switch 44, conductor 93, solenoid 75, conductor 94, counter 76, conductor 95, battery 92, conductor 96, counter 45, and thence by way of conductor 97 to the other side of switch 44.

In the use of the aforedescribed apparatus in conducting geophysical surveys, the aircraft 11 and its associated magnetometer apparatus are flown along predetermined survey lines or traverses. The record traces 19 and 69 and the photographic record 56 of the terrain are produced continuously during the course of the traverses, and the control dials 23 and 26 through 28 are adjusted, as necessary, to keep pen 17 on scale on the chart 18, or to provide the desired magnitude of the pen deflections, as the case may be.

From time to time, the operator depresses button 43 on the control box to superimpose on the photographic record of the terrain, a serial number and the magnetic data relating to the sensitivity of the magnetometer apparatus, and the magnetic value of a reference line for the trace appearing on the photographic record.

Each time this data is caused to appear on the photographic record, number counters 45 and 76 are advanced, the serial number to be photographed next appearing visually on counter 45. From time to time, particularly at the beginning and end of each traverse, the operator makes a note of the serial numbers appearing at the control box and these numbers appearing on the photographic record identify the several traverses.

After the traverses in a predetermined area have been completed and the film used therefor developed, the true distances between the serial numbers on the photographic record are determined from known distances thereon such, for example, as the distance between the intersection of road 98 with river 99 and road intersection 101.

Thereafter record trace 69 is translated into copy traces giving the true relation between the variations in the earth's magnetic field and the ground positions corresponding thereto, and from the copy traces isomagnetic contours are prepared, all in a manner set forth in the copending application of Lynn H. Rumbaugh et al. for Method and Apparatus for Conducting Geophysical Surveys, Serial No. 682,518, filed July 10, 1946.

From the foregoing, it should now be apparent that a method and apparatus for conducting magnetic explorations has been provided which is well adapted to fulfill the aforestated objects of the invention, and while the invention has been described in particularity with respect to a specific method and apparatus which gives satisfactory results, it will be understood that various changes may be made by those skilled in the art to which the invention most nearly appertains without departing from the spirit and scope of the invention as defined by the appended claims.

The invention herein described and claimed may be manufactured and used by or for the Government of the United States of America for governmental purposes without payment of any royalties thereon or therefor.

What is claimed as new and desired to be secured by Letters Patent of the United States is:

1. A method of geophysical surveying which comprises the steps of flying an aircraft and magnetometer apparatus associated therewith along a predetermined traverse, measuring the total magnetic field with said magnetometer, producing a continuous composite photographic record of the terrain beneath the plumb line of the aircraft and of a shadow trace corresponding to space changes in the total value of the earth's magnetic field detected by the magnetometer apparatus as the aircraft moves along the traverse, and at selected intervals along the traverse superimposing on the photographic record a serial number and a plurality of numbers indicative of the sensitivity of the magnetometer apparatus and the magnetic value of a reference line for said trace.

2. A method of geophysical surveying which comprises the steps of flying an aircraft and magnetometer apparatus associated therewith along a predetermined traverse, measuring the total magnetic field with said magnetometer, producing a continuous photographic record of the terrain beneath the plumb line of the aircraft by use of a continuous-strip camera having a narrow slit, causing the needle of a galvanometer which is actuated in accordance with space changes in the total value of the earth's magnetic field detected by the magnetometer apparatus to traverse said slit in a manner to produce on the photographic record a trace indicative of said changes in the field, and at selected intervals along the traverse of the aircraft superimposing on the photographic record a serial number and a plurality of numbers indicative of the sensitivity of the magnetometer apparatus and the magnetic value of a reference line for said trace.

3. A method of geophysical surveying which comprises the steps of flying an aircraft and magnetometer apparatus associated therewith along a predetermined traverse, measuring the total magnetic field with said magnetometer, producing a continuous record trace corresponding to space changes in the total value of the earth's magnetic field detected by said magnetometer apparatus as the aircraft moves along the traverse, producing a continuous composite photographic record of the terrain beneath the plumb line of the aircraft and of a shadow trace corresponding to said record trace, indicating visually the serial number appearing on a first register counter, at selected intervals along the traverse superimposing on the said composite photographic record a photographic record of a serial number appearing on a second register counter and corresponding to the serial number appearing on the first counter and a plurality of numbers corresponding respectively to apparatus dial settings indicative of the sensitivity of the magnetometer apparatus and of the magnetic value of the base line of the record chart upon which the record trace appears, and advancing the numbers on said counters simultaneously as each number of said photographic record is superimposed on said composite photographic record.

4. In apparatus of the character disclosed for conducting magnetic explorations from an aircraft in flight, the combination of a continuous-strip camera adapted to produce a continuous photographic record of the terrain beneath the plumb line of the aircraft and having a narrow slit through which light rays from the terrain are admitted to the camera film, a galvanometer having a needle adapted to traverse said slit so as to produce a shadow trace on the film, and magnetometer apparatus for actuating the needle of said galvanometer in accordance with variations in the ambient total field detected by the magnetometer apparatus.

5. In apparatus of the character disclosed for conducting magnetic explorations from an aircraft in flight, the combination of a continuous-strip camera adapted to produce a continuous photographic record of the terrain beneath the plumb line of the aircraft and having a narrow slit through which light rays from the terrain are admitted to the camera film, means adapted to intercept said light rays and stabilize the image of the terrain on the film, a galvanometer having a needle adapted to traverse said slit so as to produce a shadow trace on the film, and magnetometer apparatus for actuating the needle of said galvanometer in accordance with variations in the ambient total field detected by the magnetometer apparatus.

6. In apparatus of the character disclosed for conducting magnetic explorations from an aircraft in flight, the combination of magnetometer apparatus including a detecting element adapted to be maintained in alignment with the earth's magnetic field, and photographic means adapted to produce a continuous photographic record of the terrain beneath the aircraft and to produce on the recorded image of the terrain a continuous shadow trace corresponding to the variations in the earth's total magnetic field detected by said element as the aircraft moves along a predetermined traverse.

7. In apparatus of the character disclosed for conducting geophysical surveys from an aircraft in flight, magnetometer apparatus including a recorder for producing a record trace on a recording chart corresponding to space changes in the absolute or static value of the earth's total magnetic field as the aircraft moves along a predetermined traverse and also including a control box having dials for indicating and adjusting the sensitivity of said magnetometer apparatus and the magnetic value of the base line of the recording chart, a number indicator having a plurality of number wheels operatively connected to said dials respectively and adapted to indicate numbers corresponding to the settings of the dials, a continuous-strip camera adapted to produce a continuous photographic record of the terrain beneath the plumb line of the aircraft and having a narrow slit through which light rays from the terrain are admitted to the camera film, means adapted to intercept said light rays and stabilize the image of the terrain on the film, means associated with the camera and operable at will for superimposing on the film thereof images of the numbers appearing on said number wheels, and a galvanometer adapted to be actuated by the same signals supplied to said recorder and including a needle adapted to traverse said slit whereby a shadow trace corresponding to the record trace is produced on the film.

HOMER JENSEN.

REFERENCES CITED

The following references are of record in the file of this patent:

UNITED STATES PATENTS

| Number | Name | Date |
| --- | --- | --- |
| 1,331,978 | Brock et al. | Feb. 24, 1920 |
| 1,585,484 | Gasser | May 18, 1926 |
| 1,658,537 | Reinhold | Feb. 7, 1928 |
| 1,912,485 | Kothny | June 6, 1933 |
| 2,167,630 | Bazzoni et al. | Aug. 1, 1939 |
| 2,307,646 | Sonne | Jan. 3, 1943 |
| 2,338,991 | Arnold | Jan. 11, 1944 |
| 2,406,870 | Vacquier | Sept. 3, 1946 |
| 2,424,772 | Rieber | July 29, 1947 |
| 2,428,034 | Nichols et al. | Sept. 30, 1947 |
| 2,468,554 | Hull | Apr. 26, 1949 |
| 2,518,513 | Wyckoff | Aug. 15, 1950 |
| 2,555,209 | Vacquier | May 29, 1951 |

FOREIGN PATENTS

| Number | Country | Date |
| --- | --- | --- |
| 319,867 | Great Britain | Oct. 3, 1929 |

OTHER REFERENCES

Heiland, "A. I. M. E. Transactions," 1932, pages 213–214.

Heiland, "Engineering and Mining Journal," December 1935, pages 609–610.

Logachev, "Geophysics," April 1946, pages 135–147.

"The Airborne Magnetometer," in Geophysics, July 1946, pages 321–334.